United States Patent Office 3,548,501
Patented Dec. 22, 1970

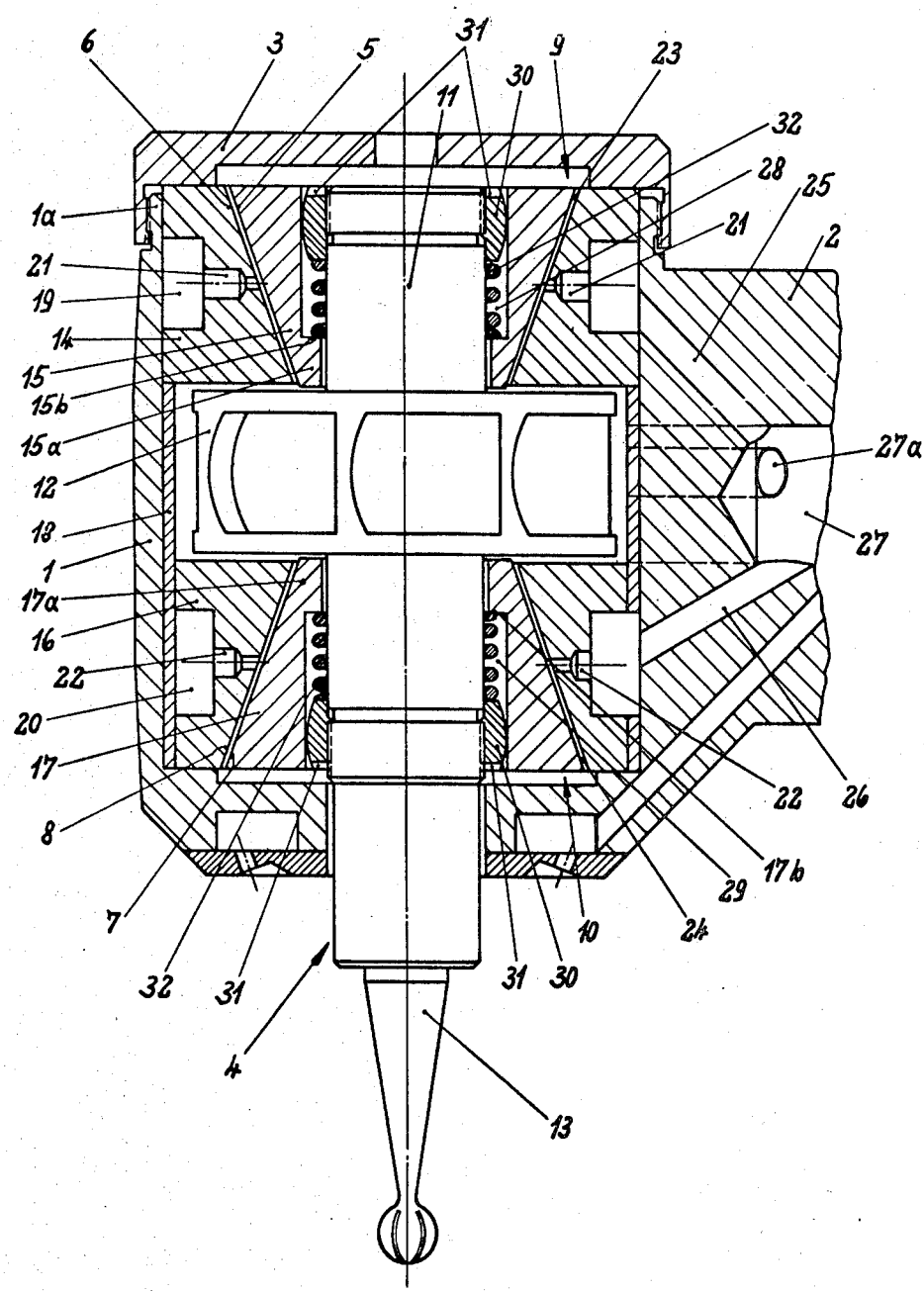

3,548,501
TURBINE TYPE DENTAL HANDPIECE
Erich Hoffmeister, Biberach an der Riss, Germany, assignor to Kallenbach & Voigt, Biberach an der Riss, Germany, a company of Germany
Filed July 11, 1968, Ser. No. 744,163
Claims priority, application Germany, July 13, 1967, 1,566,236
Int. Cl. A61c 1/10
U.S. Cl. 32—27
8 Claims

ABSTRACT OF THE DISCLOSURE

A dental handpiece comprises a turbine rotor supported in plain bearings disposed at opposite sides of the turbine impeller, each bearing comprising inner and outer bearing rings having frusto-conical bearing surfaces which face one another and between which compressed air is supplied to form a gap between the frusto-conical bearing surfaces. Each inner ring is arranged with play on the rotor shaft and has a bore formed with an enlarged portion in which there is located a compression spring confined between a clamping ring on the shaft and a shoulder within the bore so that, during operation, the inner bearing ring can rotate with the shaft.

BRIEF SUMMARY OF THE INVENTION

This invention relates to a turbine type dental handpiece wherein the turbine rotor is mounted in plain bearings which are lubricated with compressed air and are provided with frusto-conical sliding surfaces.

A turbine type dental handpiece of this kind is already known which comprises two plain bearings and wherein each plain bearing has an inner bearing ring arranged fixedly on the rotor shaft and an outer bearing ring fixed in the turbine housing by means of elastic rings. In order to permit compensating for manufacturing tolerances and to permit the adjustment of an air gap between the bearing rings, the use of spacer discs between the turbine impeller and an inner bearing ring is known. However, this arrangement has the disadvantage that adjustment and, where appropriate, re-adjustment of the bearing air gaps in the case of bearings which are not precisely in alignment is difficult.

The present invention obviates the aforesaid disadvantage and proposes that at least one plain bearing has an inner bearing ring which is arranged on the rotor shaft with play and which is displaceable in the axial direction in opposition to the action of a spring. The arrangement according to the invention makes it possible, in the case of non-aligned bearings, for the inner bearing ring which is arranged with play on the rotor shaft to carry out automatically radial or axial or tilting movements to adapt to the position of the associated outer bearing ring.

In an advantageous form of embodiment of the invention, the shaft bore of each inner bearing ring arranged with play on the rotor shaft has an enlarged or widened portion with which it surrounds with play a clamping ring fixed in axially adjustable manner on the rotor shaft, the spring abutting the clamping ring and on the surface adjoining the widened portion of the shaft bore such that the inner bearing ring rotates with the rotor shaft. The spring opposes axial displacement of the inner bearing ring on the rotor shaft due to the action of the compressed air. The spring force and the size of the bearing air gap can be adjusted in a simple manner by adjusting the position of the clamping ring.

BRIEF DESCRIPTION OF THE DRAWING

The single figure of the accompanying drawing shows in longitudinal section, a head housing of a turbine type dental handpiece.

DETAILED DESCRIPTION

The illustrated embodiment comprises a head housing 1 which is connected by way of a neck portion 2 to a handle sleeve (not shown). Screwed onto the end 1a of the head housing is a housing cover 3. A turbine rotor 4 is supported in the interior of the head housing in plain bearings 9 and 10 provided with compressed air lubrication and with frusto-conical sliding surfaces 5, 6 and 7, 8. The plain bearings are arranged at both sides of a turbine impeller 12 which is fixed onto a rotor shaft 11. A dental tool 13 is fixed with its shank in a central longitudinal bore of the rotor shaft.

Each plain bearing 9 and 10 has an outer bearing ring 14, 16 respectively and an inner bearing ring 15, 17 respectively. The outer bearing rings are respectively mounted in fixed relation in the head housing 1 and in a sleeve 18 arranged with a tight fit in the head housing. Annular grooves in the outer bearing rings form annular ducts 19 and 20 which serve to distribute the bearing-action compressed air. Through a plurality of radial bores 21, 22 the compressed air is fed to the bearing gaps 23 and 24. Branch conduits 25 and 26 connect the annular ducts to a main compressed air conduit 27. Compressed air is fed to the turbine impeller 12 by way of a conduit section 27a.

The inner bearing rings 15 and 17 are arranged with play on the rotor shaft 11. Between the inner ends 15a and 17a of the inner bearing rings and the rotor shaft 11 the radial play amounts to between 0.1 and 0.9 mm. The shaft bores of the inner bearing rings have an enlarged diameter portion 28, 29 respectively, by means of which the inner bearing rings surround, with a radial play of between 0.001 and 0.009 mm., clamping rings 30 which are screwed on the rotor shaft and which have a convex external surface. In order to enable the clamping rings to be easily screwed onto the rotor shaft, radial slots 31 are formed in the rings which permit introduction of a suitably constructed tool. In the enlarged diameter portions of the shaft bores there are inserted coil springs 32 constructed as compression springs which abut against the clamping rings 30 and on the radial surfaces 15b and 17b adjoining the enlarged diameter portions.

The compressed air fed to the bearing-action air gaps 23 and 24, when the handpiece is in operation, effects an axial movement of the inner bearing rings 15 and 17 towards the ends of the head housing and a corresponding compression of the coil springs 32 is effected until the forces are in a state of equilibrium. Due to the static friction occurring between the contacting surfaces of the coil springs and the inner bearing rings and clamping rings, the inner bearing rings are entrained when the rotor shaft rotates.

The mobile arrangement of the inner bearing rings on the rotor shaft, described hereinbefore, has the result that even if the turbine rotor is tilted, for example, by application of transverse forces to the tool 13, the inner bearing rings can compensate for this movement so that the air cushion between the bearing rings is maintained and any running of the inner bearing rings against the outer bearing rings is prevented.

What is claimed is:

1. A turbine type dental handpiece comprising a housing, a turbine rotor including a shaft inserted in said housing, an impeller on said shaft at an inermediate location therein, bearing means for said rotor, said bearing means including a plain bearing on opposite sides of said impeller, each bearing including outer and inner bearing members having frusto-conical bearing surfaces facing one another, said inner bearing member being mounted loosely on said rotor shaft for axial displacement therealong, said outer bearing member being fixedly mounted in said housing, means for introducing a pressure fluid between said bearing surfaces to displace the inner bearing member along the shaft and maintain a gap between said frusto-conical surfaces, the gaps between the frusto-conical surfaces increasing in diameter in a direction away from said impeller, spring means acting on said inner bearing members to urge the frusto-conical surfaces thereof towards the facing frusto-conical surfaces of the outer bearing members and to elastically resist the action of the pressure fluid introduced between the bearing members, each said inner bearing member having a bore and a shoulder formed therein, and a clamping ring secured on said shaft facing said shoulder, said spring means being interposed between said ring and said shoulder to cause the inner bearing member to rotate with the rotor shaft.

2. A handpiece as claimed in claim 1, wherein said spring means comprises a coil spring encircling said shaft.

3. A handpiece as claimed in claim 1 comprising means securing said clamping ring on said shaft for axial adjustment thereon.

4. A handpiece as claimed in claim 3 wherein said bore has an enlarged portion at the end of which said shoulder is formed, said clamping ring and spring means being accommodated in said enlarged portion of the bore.

5. A handpiece as claimed in claim 4 wherein said clamping ring has an outer surface which is closely surrounded by the inner bearing member in the enlarged portion of the bore.

6. A handpiece as claimed in claim 5 wherein said outer surface of the clamping ring is convex and enables pivotal movement of said rotor shaft in the inner bearing member.

7. A handpiece as claimed in claim 3 wherein said means which secures the clamping ring on the shaft for axial adjustment comprises threads on said ring and shaft.

8. A handpiece as claimed in claim 1 wherein said inner and outer bearing members are annular rings.

References Cited

UNITED STATES PATENTS

| | | | |
|---|---|---|---|
| 3,380,162 | 4/1968 | Heathe | 32—27 |
| 3,408,043 | 10/1968 | Williams et al. | 32—27 |

OTHER REFERENCES

Dentsply, "The Dentsply Air Bearing Handpiece," pp. 1, 2, 3, and 4.

ROBERT PESHOCK, Primary Examiner

U.S. Cl. X.R.

415—3